United States Patent [19]

Gordon

[11] 4,029,899

[45] June 14, 1977

[54] POSITION INDICATOR

[75] Inventor: John Ashley Gordon, Hatfield, England

[73] Assignee: National Research Development Corporation, London, England

[22] Filed: Nov. 14, 1975

[21] Appl. No.: 632,176

[30] Foreign Application Priority Data

Nov. 20, 1974 United Kingdom ............. 50200/74
May 27, 1975 United Kingdom ............. 23141/75

[52] U.S. Cl. ............................ 178/19; 340/347 AD
[51] Int. Cl.² ................... H04N 1/00; G08C 21/00
[58] Field of Search .................. 178/19, 18, 20; 340/347 AD; 33/1 M

[56] References Cited

UNITED STATES PATENTS

3,466,646  9/1969  Lewin ........................ 340/347 AD
3,819,857  6/1974  Inokuchi .......................... 178/19

Primary Examiner—Thomas A. Robinson
Attorney, Agent, or Firm—Cushman, Darby & Cushman

[57] ABSTRACT

A graphical input device for computer aided displays is described in which the area of interest is divided by the conductors of two orthogonal sets of coils. Each region of the of interest area is within a coil or combination of coils in each set unique to that region, so that when a change of the magnetic flux associated with a stylus indicating a point of interest occurs, currents induced in the coils represent the position of the point.

21 Claims, 22 Drawing Figures

POSITION INDICATOR

The present invention relates to apparatus for indicating the position of an object, particularly but not exclusively the position of a point on a surface. The invention is expected to prove useful in the fields of graphical inputs for computers and digitisers for indicating the position of points on graphs or maps or other diagrams.

According to a first aspect of the present invention there is provided apparatus for generating a signal representative of a co-ordinate of a movable indicating member, the member being constructed to interact with magnetic flux, and the apparatus including a plurality of sensing coils, positioned substantially in or adjacent to a real or imaginary continuous surface in or adjacent to which the indicating member may be moved, the sensing coils overlapping in the direction of a required co-ordinate in the surface, and being positioned to divide an area of interest in the surface into regions with each region within an arrangement of the sensing coils particular to that region, and means responsive to change in flux linking the sensing coils and the indicating member for providing a signal representative of the co-ordinate of the indicating member.

The apparatus may, of course, include the indicating member and usually includes means for changing the magnetic flux linking the sensing coils and the indicating member when the said member is in or adjacent to the said surface.

The apparatus may include a further guide for magnetic flux, the further guide extending across the said surface over the region of the sensing coils on one side of the coils, the indicating member the being positioned on that side of the coils which is remote from the flux guide, and the means for changing magnetic flux changing the flux linking the coils, the indicating member and the further flux guide. However, the further flux guide is not necessary and does not lead to greatly improved performance.

The main advantages of the apparatus according to the first aspect of the invention are the simplicity obtainable with the apparatus in that in some coil arrangements each sensing coil is one of only $n$ or $n+1$ sensing circuits where the resolution obtained is $2^n$, relation to previously known position indicating devices which usually require $2^n$ sensing circuits for the same resolution; and that a digital output may be obtained from the means responsive to flux changes directly without the use of an analogue to digital converter.

Where the object whose position is to be signalled contains sufficient magnetic material then the object itself can sometimes form the indicating member.

According to a second aspect of the present invention there is provided apparatus for generating a signal representative of the position of a point on a surface including a plurality of sensing coils in or immediately below a surface, the sensing coils being arranged to divide the surface into regions with each region within an arrangement of sensing coils particular to that region, an indicating member movable over the surface or indicating a point, the position of which is required, the member being constructed to guide magnetic flux therethrough, means for changing the magnetic flux linking the sensing coils by way of the indicating member, and means responsive to the said change in flux for providing a signal representative of the position of the indicating member.

Apparatus according to the second aspect of the invention has the advantages previously mentioned in respect of the first aspect of the invention.

The coil arrangements for each region may, for example, be particular to that region because: the combination of coils looping that area is unique (these combinations include not looping a region at all and looping a region with one coil only); or the number of turns in a coil looping the region is unique; or the sense of turns looping the region is unique; or the combination of coils with the number of sense of turns, or both looping the region is unique; or the combination of number of turns and sense of turns is unique.

The means for changing the magnetic flux may be a driving coil around the indicating member which may then be in the form of an elongated member comprising magnetic material, or a driving coil around the further flux guide with the axis of the coil at right angles to the said surface. Driving coils may be located in both positions. However, the necessary flux guiding performed by the indicating member may be carried out by a driving coil if the elongated member is not provided. Such a driving coil is particularly useful in digitisers where the point of interest may be at the centre of a cursor formed by the coil.

The indicating member may take the form of a permanent magnet and when this is so the function of the means for changing the magnetic flux is performed by movement of the magnet since by moving the magnet into the region of the coils in indicating a required position, the flux linking the coils is changed. Further movement of the permanent magnet again changes the flux linking the coils. In this arrangement the means responsive to the change in flux is constructed to store a record of the flux changes and provides the signal representative of position from stored signals.

Where a driving coil is used to change magnetic flux a periodically varying current may be passed through the coil or pulses of current may be used. Where the driving coil surrounds the indicating member or the flux guide, signals induced in the sensing coils are decoded to generate the position indicating signal. In another arrangement the means for changing the magnetic flux linking the sensing coils may be means for passing current through the sensing coils in sequence and it is then necessary to use an indicating member incorporating a driving coil, this driving coil being part of the means responsive to flux changes. As each sensing coil is pulsed a signal is, or is not, induced in the driving coil, or alternatively pulses of different senses are included in the driving coil, and thus the pulses in this driving coil form coded signals which on decoding give the position of the indicating member. Since in this latter example the functions of the driving and sensing coils are reversed, it will be realised that in this specification and claims these designations are descriptive only in those forms of the invention mentioned earlier. By way of example a number of ways of arranging sensing coils for use in the three aspects of the invention, so that there is a unique combination of coils for each region, will now be outlined.

The sensing coils may be shaped according to sets of Walsh functions whose "sequencies" are independent with respect to the operation: bit wise modulo two addition without carry (i.e. binary addition without carrying between bits of different significance). Walsh functions can be represented by diagrams of rectangular waveforms. Each coil may be shaped to follow one function in a set, that is to follow one rectangular waveform representing the function, but a return connection is required to change the representation of the waveform, as part of a coil, into a complete coil. For most purposes practical sets of coils must include low order Walsh functions. An explanations of Walsh functions is given in "Transmission of information by orthogonal functions", by H. Harmuth second edition, Springer-Verlag 1972.

In other arrangements of the sensing coils, each coil corresponds to a binary number in a series of numbers forming a pseudo random sequence of such numbers, and each digit corresponds to a strip of the area of interest with edges normal to the direction of the co-ordinate to be measured. Traverses of the coils dividing the area of interest are then made between strips where the values of digits corresponding to adjacent strips are different.

Instead, if each sensing coil corresponds to a row or column of a Hadamard matrix (see the above mentioned publication by H. Harmuth) and each digit in a row or column corresponds to a strip of the area of interest, then traverses occur between strips where the values of digits corrsponding to adjacent strips are different.

In general the sensing coils may be arranged according to any set of independent binary functions, with each coil corresponding to one of the functions.

Again the area of interest is regarded as being divided into strips, each of which corresponds to a term in one of the functions. Each coil then traverses the area at the edges of those strips where the values of terms corresponding to adjacent strips are different.

The sensing coils may be arranged, for example, in ways generally defined as follows: a series of coils for a generally rectangular area in which the position of a point is to be located, each coil of the series comprising first and second groups of edge portions, a third edge portion, and a number of side portions, the edge portion of the first group being positioned along one edge of the area, the edge portions of the second group being positioned along the opposite edge, and the side portions so crossing the area to join edge portions, each side portion in a single traverse of the area, that a closed coil is formed, except where connections to the coil are made, with the third edge portion positioned along the said one edge or the said opposite edge in the return traverse between the other opposite edges, a side portion of the first coil in the series dividing the area into two equal regions, and the side portions of each succeeding coil, together with the side portions of the previous coils in the series, dividing the area into twice the number of equal regions as the division of the area by the side portions of the previous coil together with the side portion of the coils in the series before the said previous coil. For a rectangular co-ordinate the side portion are at right angles to the direction of the co-ordinate axis.

Preferably the division of the area is carried out without the side portions of any two coils being in the same actual or nominal positions except perhaps at the said other opposite edges of the area. In order to provide unambiguous signals from the means responsive to change in flux, a further coil is provided to enclose the area of interest. The function of this coil is explained below.

By employing two series of coils with the side portions of the coils of one series at right angles to the side portions of the coils of the other series the position of a point in rectangular co-ordinates can be signalled. Three series of coils with the sides of the coils of each series orthogonal to one another may, by careful design, be used for signalling the position of a point in three dimensions. If coils which form concentric circles are used together with coils forming sectors signals representing polar co-ordinates may also be generated.

Where the coils are arranged in the above mentioned series without the additional coil encircling the whole area, the means responsive to change in flux may include a number of exclusive OR gates one for, and associated with, each coil in the series except the first, the output of the first coil together with that of the second coil being connected to input terminals of the exclusive OR gate associated with the second coil, and for each exclusive OR gate associated with a coil higher in the series, the output of the coil is connected to the gate associated with that coil together with the output of the exclusive OR gate associated with the preceding coil in the series. If the output from the first coil in the series is taken as the most significant bit in the co-ordinate signal the second most significant bit is obtained from the exclusive OR gate associated with the second coil and so on.

Preferably the means responsive to flux change includes a number of comparators, one for, and associated with, each coil, the signal from each coil being applied to the comparator associated with that coil in order to obtain an unambiguous binary output.

In addition when the apparatus includes the coil which surrounds the entire area of interest, a number of subtraction circuits, one for, and associated with, each coil in the series are provided, each substraction circuit being arranged to subtract half the output from the coil surrounding the entire area of interest from the output of the coil associated with that substraction circuit. The output of the subtraction circuit associated with a coil is passed to the input of the comparator associated with that coil.

In many graphical input applications it is preferable if position signals are only provided when the indicating member is in contact with or adjacent to a surface. This problem can be dealt with in the present invention in a number of ways, for example gating means may be provided which only allow position indicating signals to pass to an output when the signals in the coils reach a certain magnitude indicating that flux cutting the coils has reached a predetermined magnitude and therefore that the indicating member is in close proximity to the coils. Instead the gating means may be operated by a contact detector which detects contact between the indicating means and a surface on which a position is to be indicated. The contact detector may rely on an electrical effect which is dependent on contact or it may include a pressure operated switch in the indicating means.

An indication of the movement of the indicating member or stylus over the area of interest is often useful. To this end the area may be covered with carbon paper or the like beneath a flexible transparent plastics sheet so that pressure on the sheet in drawing a line with the stylus forms a visible duplicate of the line on the back of the plastics sheet. An erasure member for cleaning the back of the sheet may then also be included.

Instead the stylus may be modified to include a marking device to mark a sheet of paper placed in the area of interest.

Since it is not necessary to use the further flux guide, the said surface and possibly the sensing coils may be at least partially transparent and mounted, for example on the face of a cathode ray tube or other display device.

Certain embodiments of the invention will now be described by way of example, with reference to the following drawings, in which.

Figure 1:
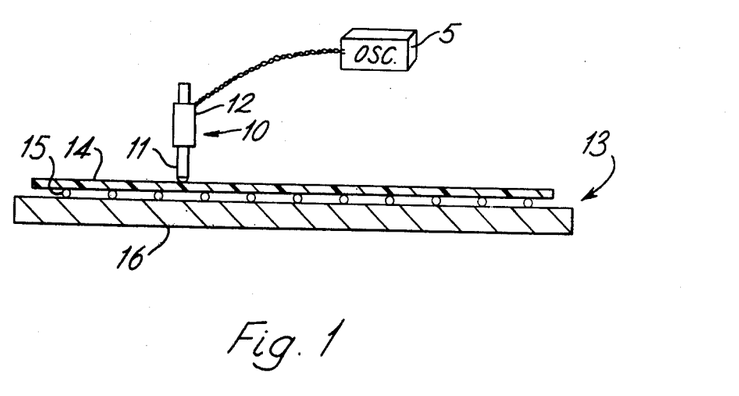
FIG. 1 is cross-section of a general arrangement of a graphical input device according to the invention.
Figure 2A:
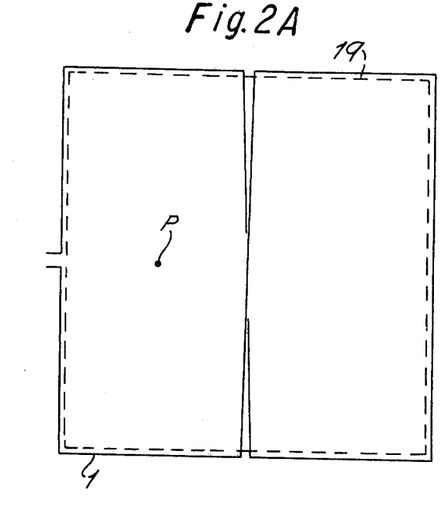
FIG. 2A to 2D shows a series of coils which may be used in the arrangement of FIG. 1, FIG. 3A to 3D show a second series of coils which may be used in the arrangement of FIG. 1.
Figure 2B:
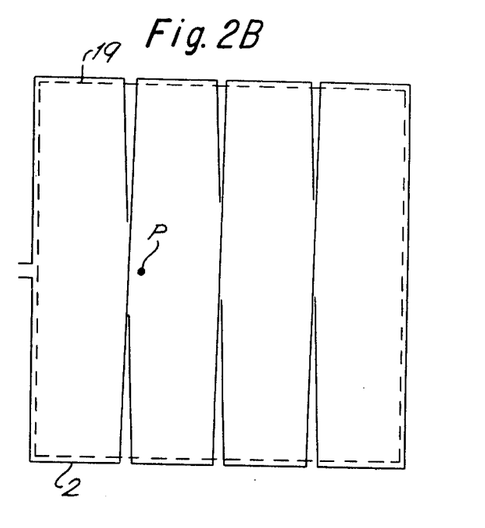
Figure 2C:
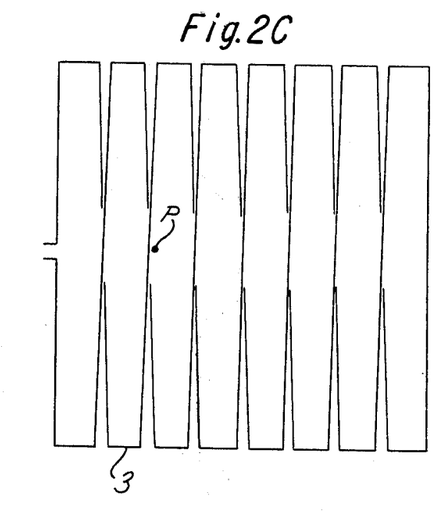
Figure 2D:
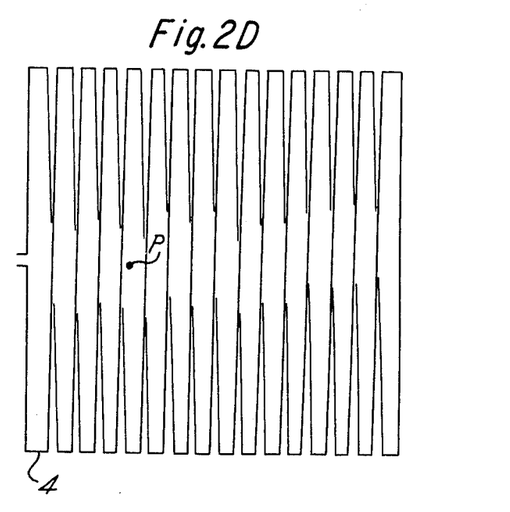
Figure 3A:
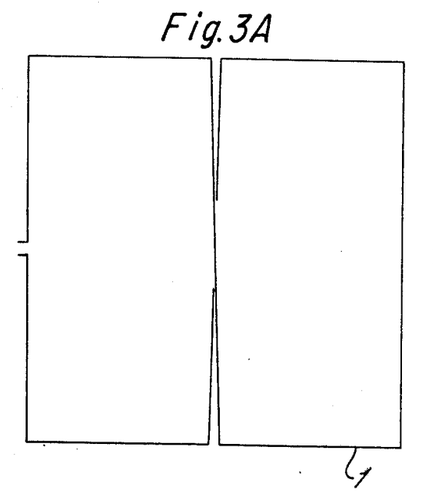
Figure 3B:
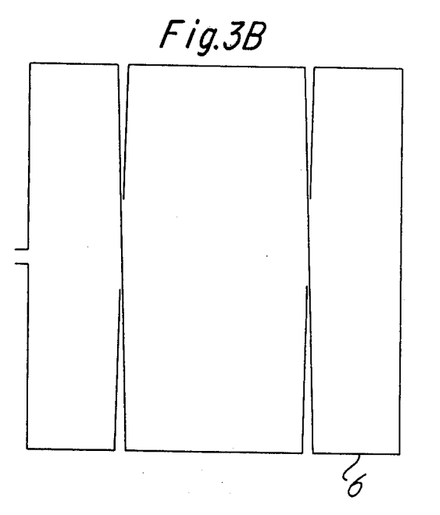
Figure 3C:
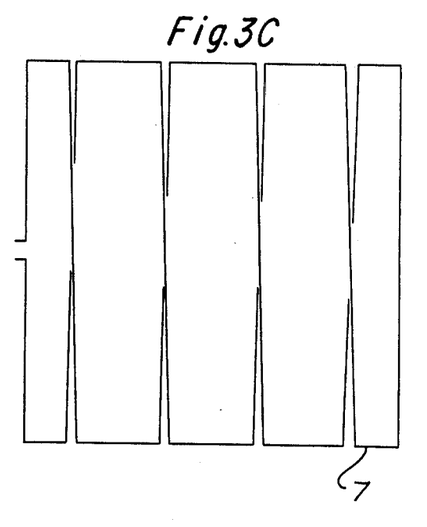
Figure 3D:
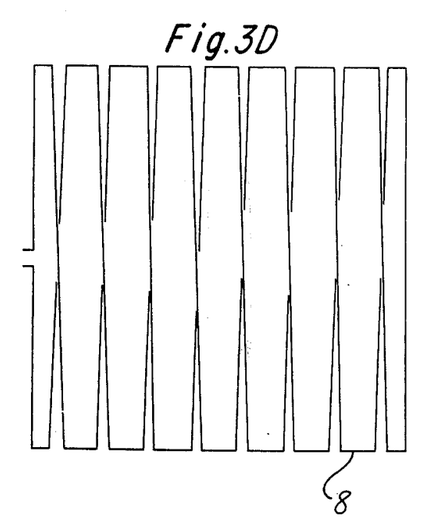
Figure 4:
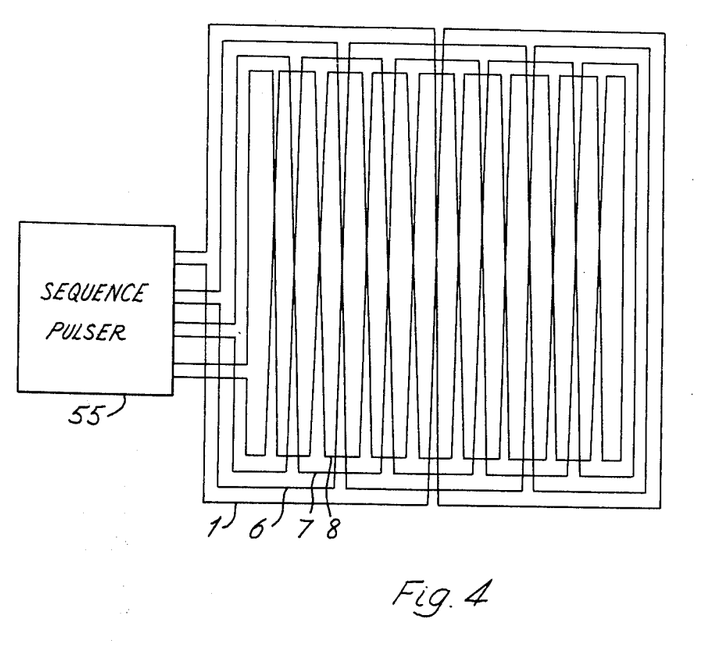
FIG. 4 shows the coils of FIG. 3 in plan view in working position.
Figure 5A:
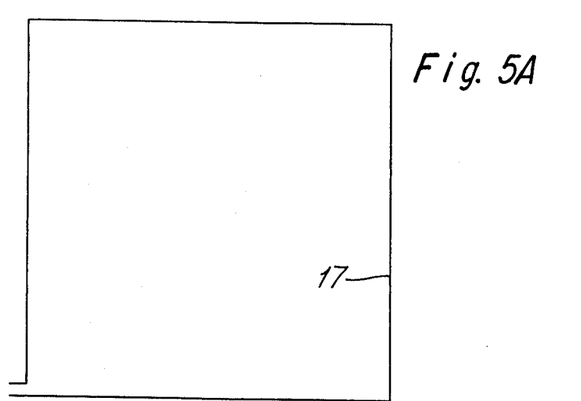
FIG. 5A to 5E show a third series of coils which may be used in the arrangement of FIG. 1.
Figure 5B:
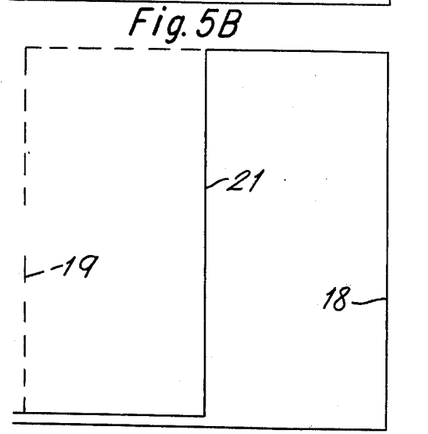
Figure 5C:
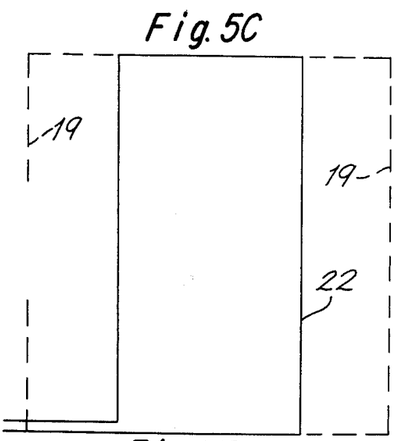
Figure 5D:
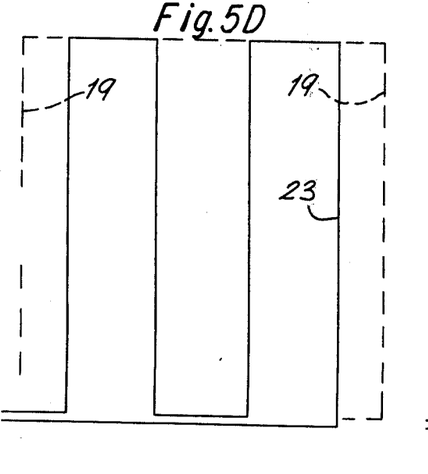
Figure 5E:
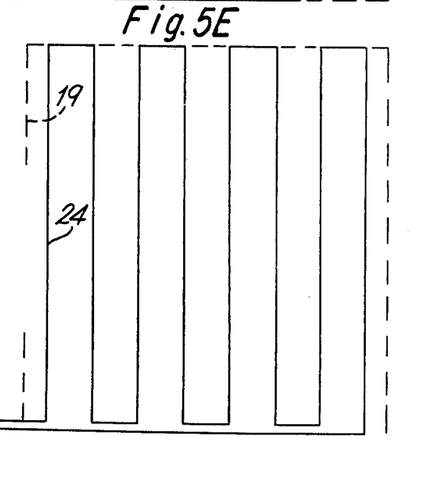

In FIG. 1 a stylus 10 includes a shaft 11 made of magnetisable material surrounded by a coil 12. The stylus is shown indicating a point on the surface of a graphical input pad 13 comprising a thin flexible insulating sheet 14, a layer of windings 15, which will be described in more detail later, and a relatively thick base 16 of magnetisable material which however need not be used.

The windings 15 are shown from above in more detail in FIGS. 2A to 2D, and may each consist of one or several turns of thin wire or instead printed conductors may be used as may the coils of the various other arrangements described below. The series of coils shown is for a resolution of 1 in 16 and only four coils are required.

A first coil 1 is in two halves wound in opposite senses and divides an area of interest designated 19 into two equal regions. The next coil 2 in the series divides the area into four equal regions and a coil 3 divides the area in eight equal regions The coils 2 and 3 are located above or below the coil 1 and a coil dividing the area into 16 regions is above or below the other coils.

In operation the coil 12 of the stylus 10 is connected to an oscillator 5 which may for example provide a continuous sinusoidal current, a continuously oscillating current of rectangular waveform or bursts of sine wave or rectangular waveform currents, or a pseudo-random sequence of pulses which is useful where weak signals are induced in the coils of a large device since correlation techniques can be used to reduce noise. Flux passes from the probe through the part of the layer 14 and the windings 15 which is immediately below the probe and into the magnetisable material 16 which forms a flux guide so that the flux loops are closed by lines of flux from the exterior of the member 16 to the upper end of the magnetisable member 11. In this way flux cuts substantially only coils which loop the point immediately below the stylus 10.

If, for example the probe indicates a point P in FIGS. 2A to 2D, then flux will link the first section of the coil 1, the second section of the coil 2, the third section of the coil 3 and the fifth section of the coil 4. If the sense of currents induced in odd numbered sections (would clockwise from an upper terminal of each coil as shown in FIGS. 2A to 2D) of the coils is designated "one" and the sense of currents induced in even numbered sections (wound anti-clockwise) is designated "zero", then the position of the point P is, as indicated by the induced currents, 1011, with currents from the coils being given significances according to the designated numbers of the coils. Thus every region of the area 19 as divided by the coil 4 has a characteristic output signal from the coils when current in the stylus 10 changes.

A problem which arises with the arrangement of FIGS. 2A to 2D is that crossovers between sections of one coil are frequently required to be laid exactly over crossovers of the other coils. This not only causes manufacturing difficulties but if not carried out to a fine degree of precision may given rise to gross errors whenever the stylus is close to a multiple crossover. It might be that to one coil the stylus appeared to the left of a nominal crossover position while to another coil it appeared to the right while the two crossovers were supposed to be coincident in the nominal position.

These problems are largely overcome by the arrangement of FIGS. 3A to 3D and 4 where while the coil 1 remains the same, the second, third and fourth coils 6, 7 and 8, respectively, correspond to the coils 2, 3 and 4 but are modified by the omission of crossovers in positions where previous coils in the series have crossovers. These coils are shown in plan view in their working positions in FIG. 4. No difficulties occur with regard to pile up of wire at the periphery of the area of interest because the coils can be extended from the periphery as required without loss of accuracy.

Figure 6:
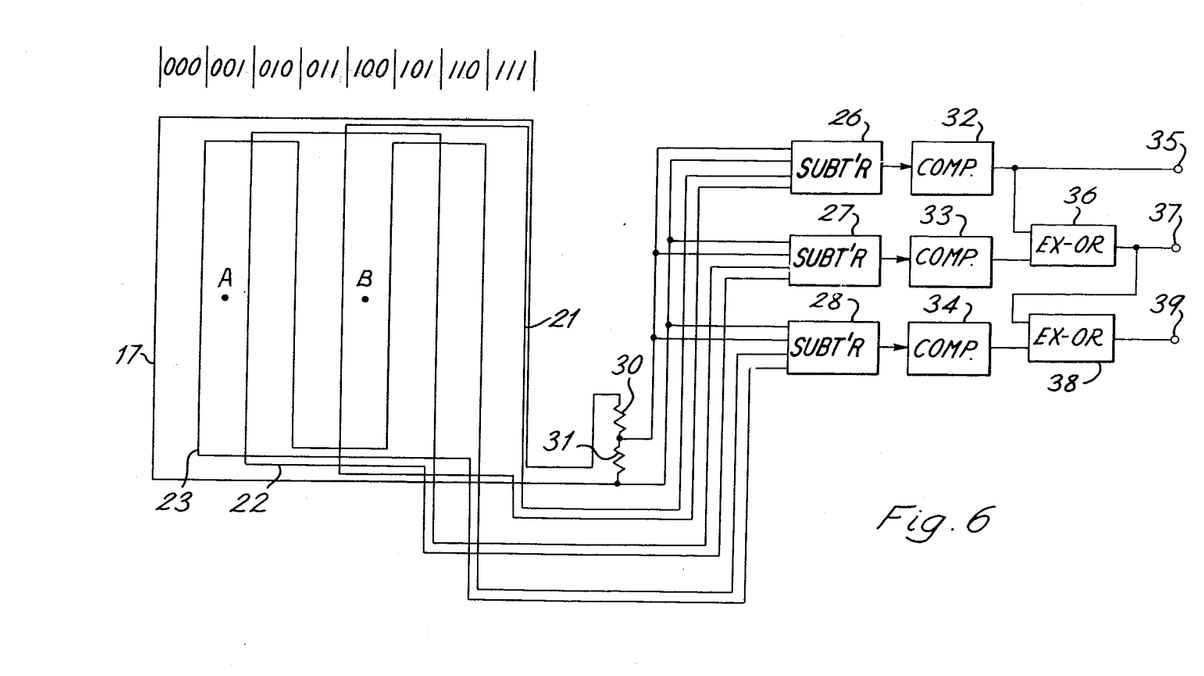
FIG. 6 is a block diagram of part of the circuit for the arrangement of FIG. 1 when used with the coils of FIG. 5.

Signals induced in the coils are passed to a logic circuit for processing to provide a binary signal indicative of stylus position. The circuit to the right of (but excluding) adder circuits 26, 27 and 28 in FIG. 6 may be used as the logic circuit with the coils 1, 6 and 7 coupled to the inputs of comparators 32, 33 and 34, respectively. A further comparator and exclusive OR gate would be required for the coil 8. The operation of the circuit of FIG. 6 is explained below.

In general, if starting with the most significant winding the windings are designated:

$$W_{m-1}, W_{m-2}, \ldots W_0;$$

the symbols required from the logic circuit are $$U_n, U_1, U_2, \ldots U_{m-1};$$

and $k_i$ denotes the sense of the signal in winding $W_i$, with the convention that $k_1 = 0$ when the probe is in the left hand extreme rectangle, and alternates between 1 and 0 as the probe is moved into successive rectangles to the right. The symbol $u_j$ is then given by the formula $$u_j = \sum_{i=j}^{m-1} k_i\, p \bmod 2 \qquad \text{equation 1}$$

(where the expression $p$ and 2 has the meaning zero if the integer $p$ is even and the meaning unity if the integer $p$ is odd). This formula may be replaced by the recursive formula:

$$\left.\begin{array}{l} u_{m-1} = k_{m-1} \\ u_j = (k_j + u_{j+1}) \bmod 2,\, j \neq m-1 \end{array}\right\} \qquad \text{equation 2}$$

This latter formula immediately suggests simple digital circuitry for finding the symbols $U_o$ to $U_{m-}$, to any competent electronics engineer with a knowledge of digital systems. For example a set of modulo-2 gates may be used to perform the modulo-2 addition of equation 2.

It is usually more convenient, as has been mentioned, to change the magnetic flux linking the coils by coupling an oscillator to the drive coil 12 (FIG. 1) and a logic circuit to the sensing coils. However, as has also been mentioned, currents can be passed through the sensing coils to change the flux while a logic circuit is coupled to the drive coil. Thus although a logic circuit is, in most arrangements coupled to the coils, in order to illustrate the other arrangement mentioned a sequence pulser 55 for pulsing the coils in sequence is shown coupled to the coils in FIG. 4.

A further improvement in the arrangement of sensing coils is the removal of crossovers as shown in the arrangement of FIGS. 5A to 5E where the first coil 17 follows the extreme edge of the area of interest designated 19 and the second coil 18 is positioned over the coil 17. The side portion 21 of the coil 18 divides the area 19 into two halves. The next coil in the series, coil 22, when placed over the coil 18 has side portions which divide the area of interest together with the side portions of the coil 18 into four equal portions. Similarly a coil 23 having four side portions divides, together with the coils 18 and 22, the area of interest into eight portions. Coil 24 together with the other coils then divides the area into 16 equal portions.

The coils 17 to 24 may be placed over one another as mentioned, or, to prevent build-up to conductors at the edges, one within another.

It will be noted that the arrangement of coils shown, except for the coil 17, is derived from that shown in FIGS. 3A to 3D and 4, and that crossovers within coils are avoided. Clearly this is an important advantage in the manufacture of graphical input pads and like devices since it avoids the necessity of locating conductors crossing the area exactly on top of one another.

Although only a relatively small number of sensing elements in the form of coils are used a direct digital output can be obtained from the coils by way of the simple decoding circuit shown in FIG. 6. The output is in the form of a binary number having the usual arrangement of bits which are more significant towards the left of the number.

In order to simplify FIG. 6 only the coils 17, 21, 22 and 23 are included but it will be realised that in practice depending on the resolution required, the coil 24 and a number of other coils would be required.

In order that the binary numbers relating to each region can be easily seen they are marked above the coils in FIG. 6 between lines representing graduations of the X co-ordinate.

Three subtractor circuits 26, 27 and 28 are connected to the coils 21, 22 and 23 respectively and in addition each subtractor circuit receives half the output signal from the coil 17 derived by way of a potentiometer consisting of two equal resistors 30 and 31. In practice the subtractor circuits may simply be an appropriate arrangement of connections allowing the difference between the voltages in each of the coils 21, 22 and 23 from that in the coil 17 to be obtained. The subtractor circuits 26, 27 and 28 are connected to comparators 32, 33 and 34, respectively, each of which may conveniently comprise a saturable amplifier. The output from the comparator 32 is connected to an output terminal 35 at which the most significant bit appears and the output from this comparator is also connected to an exclusive OR gate 36 which also receives the output from the comparator 33. The output of this OR gate is connected to an output terminal 37 where the second most significant figure appears. A further exclusive OR gate 38 receives the output from the gate 36 and also that from the comparator 34 and its output is connected to an output terminal 39 where the least significant bit appears.

Taking as an example a point A the position of which is in operation indicated by the stylus 10, it is seen that flux from the stylus in this position links only the coils 17 and 23. Thus the output from the subtractors 26 and 27 will be half the negative value E of the signal induced in the coil 17 while the output from the subtractor 28 will be $E - (E/2)$ where it is assumed that the voltage induced in each of the coils is the same and equal to E. The application of these voltages to the comparators 32, 33 and 34 produces a binary output in which a negative signal such as $(-E/2)$ is represented by a zero voltage, a positive signal such as $(+E/2)$ is represented by a positive voltage, that is the outputs of the comparators 32, 33 and 34 can be represented by the binary digits 0, 0 and 1 respectively. Hence it can be seen that the signals appearing at the terminals 35, 37 and 39 represent the same digits 0, 0, 1 which correspond to the X co-ordinate of the point A as shown at the top of FIG. 6.

In a further example, the point B, is now considered. The coils 17, 21 and 22 loop the point B but the coil 23 does not. Hence the subtractor circuits 26 and 27 each receive the voltage $E - E/2$ and the subtractor circuit 28 receives the voltage $-E/2$. The comparators 32, 33 and 34 then output signals representing the numbers 1, 1 and 0 respectively, so that the signals appearing at the terminals 35, 37 and 39 are 1, 0 and 0 respectively. These digits again correspond to the binary number for the X co-ordinate of the point B.

The coil 17 is not essential but it allows binary ones and zeros to be represented by voltages of opposite polarities.

Figure 7:
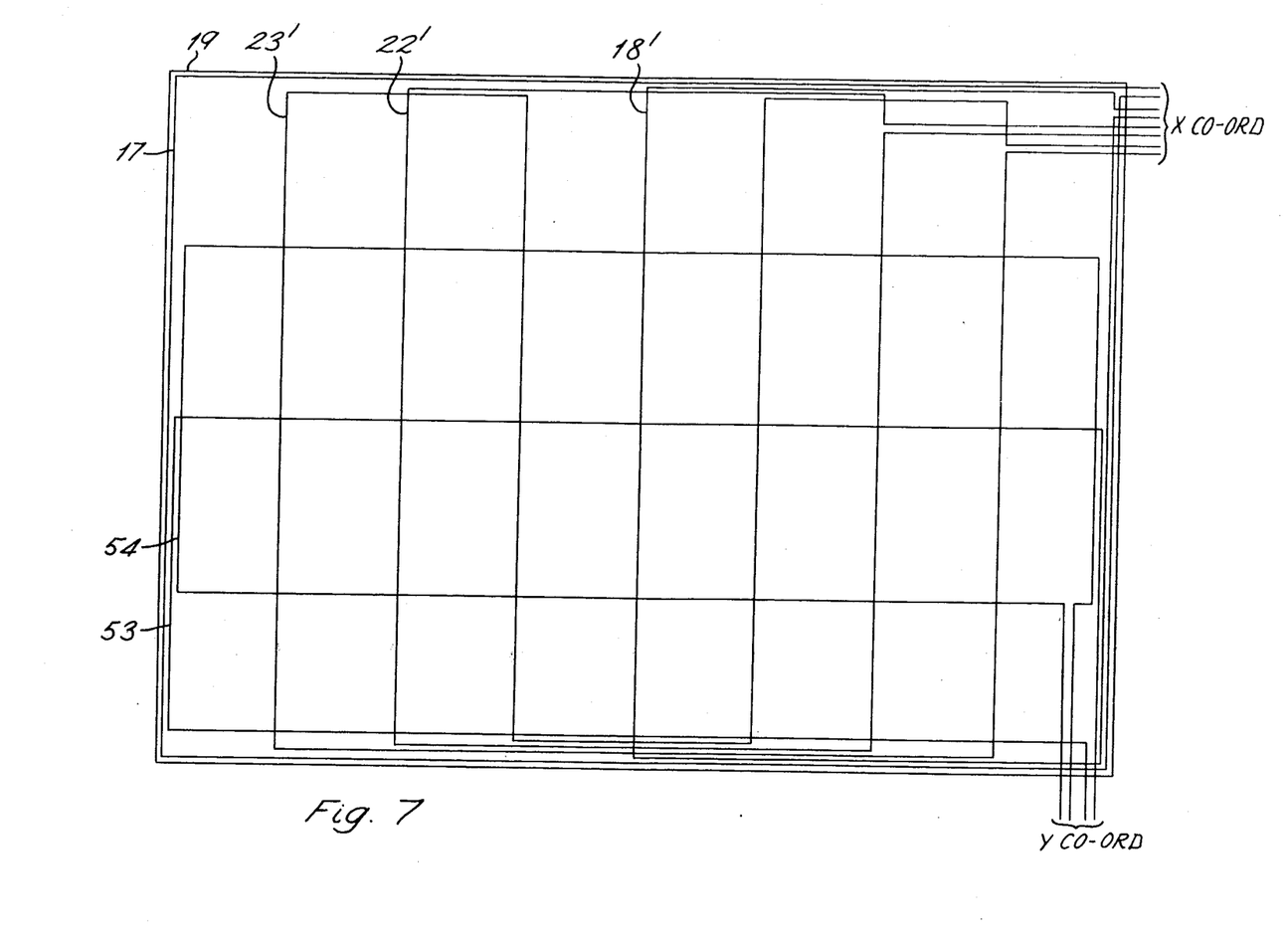
FIG. 7 shows a series of coils for X and Y co-ordinates.

In most applications two co-ordinate signals will be required and, as is mentioned above, two series of coils which traverse the area of interest at right angles are required. Such an arrangement is shown in FIG. 7 where a single coil 17 surrounding the whole area of interest 19 is shown, together with three coils 18', 22' and 23' for the X co-ordinate and two coils 53 and 54 for the Y co-ordinate. Each series of coils is connected to its own group of subtractor circuits, comparators and exclusive OR gates (not shown) arranged as indicated in FIG. 6.

The general rule for determining the coils of FIG. 6, after coils 17 and 21 have been chosen, is to divide each remaining portion between conductors in two using conductors of the next coil and then repeat the procedure for each further coil. However, (unless crossovers are used) no conductor follows the same route as a conductor of a previous coil.

Many other practical schemes for the arrangement of coils fall within the invention but only a few of these need to be mentioned briefly.

Figure 8:
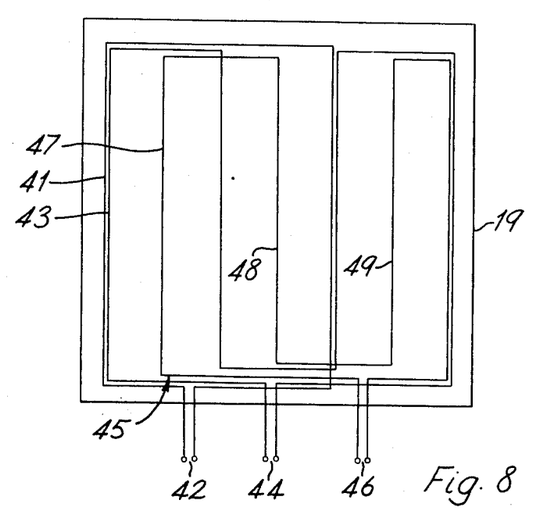
FIG. 8 shows a further series of coils which may be used in the arrangement of FIG. 1.

In FIG. 8 an arrangement is shown in which the region of interest is divided by three coils into thirds then sixths and this progression is continued in practice to include, for example, twelfths and twenty-fourths. For simplicity only three coils are shown in FIG. 8. Coil 41 with output terminals 42 encloses the left-hand two thirds of the area of interest 19 and coil 43 with terminals 44 encloses the extreme left and extreme right thirds of the area. Coil 45 with terminals 46 has traverses 47, 48 and 49 to divide the region into sixths but these traverses occur only where coils 41 and 43 do not traverse. In order to complete the coil 45 a further traverse is made just outside the area of interest so that the coil can be completed.

For every point in the region a unique code of output signals appears at the terminals 42, 44 and 46 and a suitable decoding circuit may be provided to convert these signals into the normal progression of significant figures. As in FIG. 6 an outer coil (not shown) may be provided to give less ambiguous signals from the coils. It will be seen that although three coils are used in the example of FIG. 8 the region of interest is divided into only six portions instead of eight in FIG. 6. Thus the arrangement of FIG. 8 is not so efficient as that of FIG. 6 but it could however be useful in some circumstances. Clearly other rules for dividing the region can be used such as division into fifths, sevenths and so on, but efficiency decreases as the denominator of these fractions increases.

Furthermore division of the area 19 by conductors does not have to be linear and in some circumstances, for example where a function being digitised or a figure being inspected is non-linear, other arrangements such as a log division of the portions may well be useful.

Figure 9:
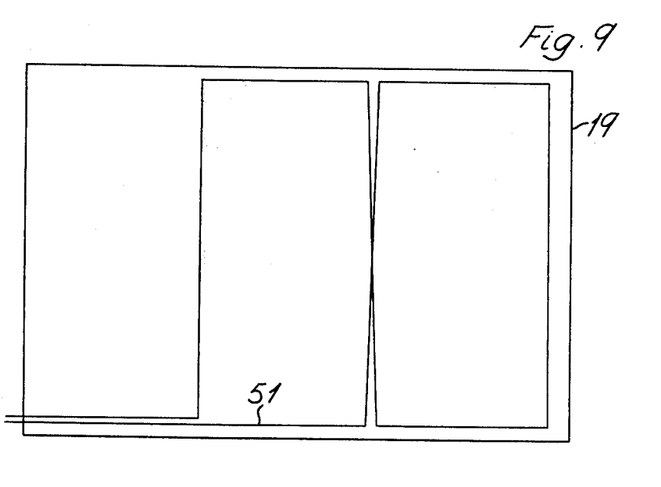
FIG. 9 shows a ternary coil which may be used with others of the same type but different dimensions in the arrangement of FIG. 1.

Up to this point the coils described generate binary signals but with the arrangement of FIG. 9 a ternary signal can be provided. A coil 51 divides the region of interest into three portions, an extreme left portion which is not enclosed by the loop 51, a middle portion which is enclosed by following the loop in one sense and an extreme right portion which is enclosed by following the loop in the other sense. Thus three signal are available at the output coil 51: zero, +1 and —1. By dividing the region into smaller areas with further coils of the same type as the coil 51, the desired resolution with ternary coils may be achieved.

Systems of sensing coils for more digits can be used by arranging sensing coils as follows: a first digit, for example "zero", is represented by not looping a portion of the area of interest, a second digit by a single loop, a third digit by a second loop and so on. Where for example a decimal system is to be used the ninth portion is looped eight times, a first set of coils divides the area of interest with 10 portions, a second set of coils divides each of these portions into 10 sub-portions and so on. If the coils contain cross-overs allowing signls of opposite senses to be induced the number of turns required may be approximately halved. In one sensing coil arrangement the whole area of interest is divided by a single coil with different numbers of loops round each portion of the area.

Figure 10:
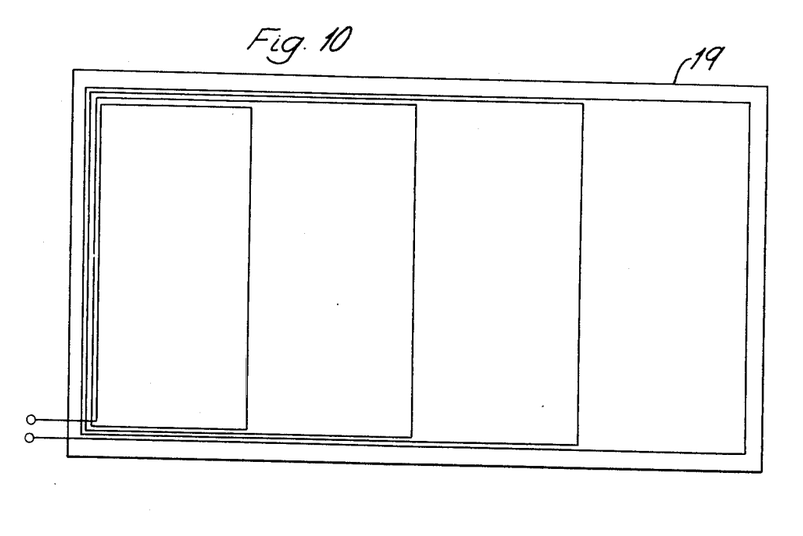
FIG. 10 shows a further coil for systems in which four digita are used.

An example of a four digit sensing coil is shown in FIG. 10 and this type of coil may be used either in multi or single coil arrangements. In FIG. 10, however, each digit is represented by at least one coil loop.

Figure 11A:
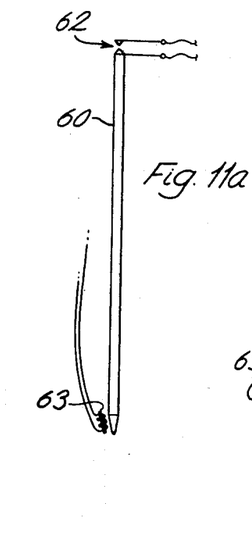
FIGS. 11a and 11b show schematically the interior components, and exterior, respectively, of a pen which may form part of a device according to the invention.
Figure 11B:
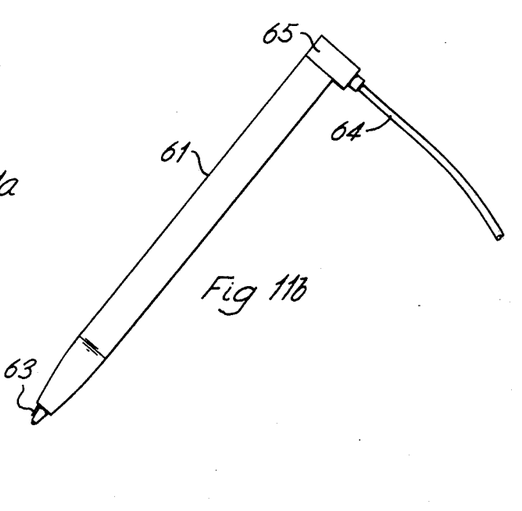

As has been mentioned the stylus may be in the form of a writing instrument with a pressure operated switch to indicate when the input device should provide coordinate signals. The cartridge 60 (see FIG. 11a) of a ball point pen is so positioned within a housing 61 (shown only in FIG. 11b) that when pressure is applied to the ball a pair of contacts 62 close indicating that the pen is in use. Adjacent to the cartridge 60 is a small elongated member 63 of magnetisable material carrying a coil, the components being analogous to, and carrying out the function of the shaft 11 and coil 12 of FIG. 1. In FIG. 11b the wires from the contacts 62 and the coil round the member 63 are enclosed by a sheath 64 and the pressure switch containing the contacts is designated 65.

Although a number of specific embodiments of the invention have been described, it will be clear that many other ways of putting the invention into practice are possible. For example in the simplest form of the invention the region of interest is simply divided by a number of elongated rectangular coils which are situated side by side with their longitudinal axes parallel but without overlap of the coils. Numerous other possibilities will occur but those of particular practical utility will have coils which overlap to provide a unique combination enclosing each portion into which the region of interest has been divided by the coils.

I claim:

1. Apparatus for generating a signal representative of a co-ordinate of a movable indicating member, the member being constructed to interact with magnetic flux, and the apparatus including:
    a plurality of sensing coils, positioned substantially in or adjacent to a real or imaginary surface in or adjacent to which the indicating member may be moved, the sensing coils overlapping in the direction of a required co-ordinate in the surface, and being positioned to divide an area of interest in the surface into regions, each coil encircling part of said area of interest having conductors in the said area substantially along region boundaries only, and each region being within an arrangement of the sensing coils particular to that region, a further coil, positioned substantially in or adjacent to the said surface and surrounding the entire area of interest, and
    means responsive to change in magnetic flux passing through the said area of interest by way of the indicating member for providing signals representative of the co-ordinate of the indicating member, by separately combining signals from said further coil with signals from each of said sensing coils to provide a group of binary signals indicative of said coordinate 2. Apparatus according to claim 1, including means for changing the magnetic flux passing by way of the said area and the indicating member.

3. Apparatus according to claim 2, including
    an indicating member having a drive coil mounted thereon.

4. Apparatus according to claim 3, including:

means for passing a varying current through the drive coil in order to change the magnetic flux linking the sensing coils and the indicating member.

5. Apparatus according to claim 2, including:
means for passing currents through each sensing coil in turn in order to change the magnetic flux linking the sensing coils and the indicating member, whereby signals induced in the drive coil are indicative of the position of the indicating member.

6. Apparatus according to claim 1, including:
an indicating member constructed to interact with magnetic flux.

7. Apparatus according to claim 3 wherein the indicating member includes magnetic material.

8. Apparatus according to claim 2 wherein each sensing coil arrangement is particular to one region because:
the combination of sensing coils looping that region is unique; or
the number of sensing coil turns looping that region is unique; or
the combination of sensing coils with the number of sensing oil turns looping that region is unique; or
the combination of sensing coils, number of sensing coil turns and sense of sensing coil turns is unique; or
the combination of number of sensing coil turns and sense of sensing coil turns is unique; or
the combination of sensing coils and sense of sensing coil turns is unique.

9. Apparatus according to claim 2 wherein each sensing coil corresponds to a function in a set of Walsh functions having sequencies independent with respect to the operation : bit wise modulo two addition without carry, the area of interest is divided hypothetically into strips at right angles to the direction of the co-ordinate signal to be indicated, each strip corresponds to a term in the function, and the sensing coils divide the area by traversing it at the edges of the strips where values of terms corresponding to adjacent strips are different.

10. Apparatus according to claim 2 wherein each sensing coil corresponds to a function in a set of independent binary functions, the area of interest is divided hypothetically into strips at right angles to the direction of the co-ordinate to be indicated, each strip corresponds to a term in the functions, and the sensing coils divide the area by traversing it at the edges of the strips where the values of terms corresponding to adjacent strips are different.

11. Apparatus according to claim 2 wherein the sensing coils form a series of coils for dividing the area into regions, each coil of the series comprising first and second groups of edge portions, a third edge portion, and a number of side portions, the edge portions of the first group being positioned along one edge of the area, the edge portions of the second group being positioned along the opposite edge, and the side portions so crossing the area to join edge portions, each side portion in a single traverse of the area, that a closed coil is formed, except where connections to the coil are made, with the third edge portion positioned along the said one edge or the said opposite edge in the return traverse between the other opposite edges, a side portion of the first coil in the series dividing the area into two equal regions, and the side portions of each succeeding coil, together with the side portions of the previous coils in the series, dividing the area into twice the number of equal regions as the division of the area by the side portions of the previous coil together with the side portions of the coils in the series before the said previous coil.

12. Apparatus according to claim 11 wherein the area of interest is generally rectangular and the side portions of the coils are at right angles to the direction of the co-ordinate to be indicated.

13. Apparatus according to claim 12 wherein the side portions of each coil traverse the area of interest at positions which are different from the positions of the side portions of other coils, except along the said other opposite edges.

14. Apparatus according to claim 2 wherein the sensing coils divide the area of interest with a first series of traverses of the area, and the apparatus includes a group of additional sensing coils positioned substantially in, or adjacent to, the said surface, to divide the area of interest into regions with a second series of traverses at right angles to the traverses of the first series, each region formed by the second series of traverses being within an arrangement of additional sensing coils particular to that region.

15. Apparatus according to claim 14 wherein the traverses of the first series are parallel to one another and the traverses of the second series are parallel to one another.

16. Apparatus according to claim 13 wherein the means responsive to change in flux may include a number of exclusive OR gates one for, and associated with, each coil in the series except the first, the output of the first coil together with that of the second coil being connected to input terminals of the exclusive OR gate associated with the second coil, and for each exclusive OR gate associated with a coil higher in the series, the output of the coil is connected to the gate associated with that coil together with the output of the exclusive OR gate associated with the preceding coil in the series, the output from the first coil, in operation, providing the most significant bit in the co-ordinate signal, the exclusive OR gate associated with the second coil providing the second most significant bit, and so on.

17. Apparatus according to claim 11 wherein the means responsive to change in flux includes a number of subtraction circuits, one for, and associated with, each coil in the series, each subtraction circuit being arranged to subtract half the output from the coil surrounding the entire area of interest from the output of the coil associated with that subtraction circuit, a number of exclusive OR gates one for, and associated with, each coil in the series except the first, the output of the subtraction circuit associated with the first coil together with that of the subtraction circuit associated with the second coil being connected to input terminals of the exclusive OR gate associated with the second coil, and for each exclusive OR gate associated with a coil higher in the series, the output of the subtraction circuit associated with the coil is connected to the gate associated with that coil together with the output of the exclusive OR gate associated with the preceding coil in the series, the output from the subtraction circuit associated with the first coil, in operation, providing the most significant bit in the co-ordinate signal, the exclusive OR gate associated with the second coil providing the second most significant bit, and so on.

18. Apparatus according to claim 2 including:
a further guide for magnetic flux extending across the area of interest but on that side of the sensing coils remote from the surface.

19. Apparatus according to claim 18 wherein the means for changing the magnetic flux includes a drive coil around the further flux guide, with the axis of the drive coil normal to the said surface.

20. Apparatus according to claim 3 wherein the indicating member includes means for generating a signal indicating when the indicating member is in position for the generation of signals representing co-ordinates.

21. Apparatus for generating a signal representative of the position of a point on a surface including:

a plurality of sensing coils in or immediately below a real or imaginary surface, the sensing coils being arranged to divide an area of interest in the surface into regions, each coil having conductors in the said area along region boundaries only, and each region being within an arrangement of sensing coils particular to that region, a further coil positioned in or immediately below the said surface and surrounding all the said regions, an indicating member movable over the surface for indicating a point, the position of which is required, the member being constructed to guide magnetic flux therethrough, means for changing the magnetic flux linking the sensing coils and the further coil by way of the indicating member, and means responsive to the said change in flux for providing a signal representative of the position of the indicating member, including means for interpreting signals induced in each sensing coil with the assistance of signals induced in the further coil when a change of flux occurs, in providing the signals representative of a coordinate.

* * * * *